Figure 1:
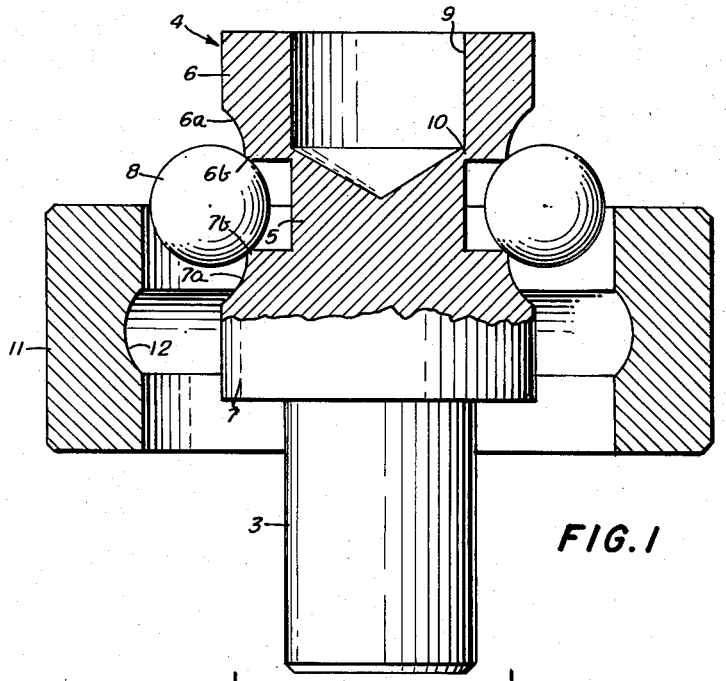

June 29, 1965   R. C. CARTER, JR   3,192,002
SPLIT CONE BALL BEARING
Filed Sept. 6, 1963

INVENTOR
ROGER C. CARTER, JR.

BY Raphael Semmes

ATTORNEY

United States Patent Office 3,192,002
Patented June 29, 1965

---

3,192,002
SPLIT CONE BALL BEARING
Roger C. Carter, Jr., East Hartford, Conn., assignor to Hartford Steel Ball Company Division of Virginia Industries, Inc., West Hartford, Conn., a corporation of Delaware
Filed Sept. 6, 1963, Ser. No. 307,098
5 Claims. (Cl. 308—193)

This invention relates to the field of ball bearings and consists more particularly in new and useful improvements in a ball bearing structure wherein the inner raceway is prefabricated as an integral part of the spindle, and in subsequent assembly with the outer raceway, provides matched halves of a split cone construction which forms the inner raceway.

Heretofore, in the manufacture of this general type of bearings, it has been necessary to separately fabricate from three to five individual parts, exclusive of the balls, in order to produce split cone bearings, which not only added to the cost of manufacture, but required considerable time in selecting matching parts for assembly.

An object of the invention is to provide a bearing of the split cone type wherein the spindle is prefabricated to embody the two halves of the inner raceway as an integral part thereof, said halves being initially arranged in longitudinally spaced relation so as to accommodate a set of balls during assembly within the outer raceway. In the assembly operation, after the insertion of the balls, the two halves of the raceway are servered and forced together to jointly form the inner raceway.

Another object of the invention is to provide a bearing of this character including an initially one-piece spindle and inner raceway which, during assembly, provides a two-piece inner raceway, the halves of which are secured in assembled form by a pressed fit and without the requirement of rivets or additional securing means.

Still another object of the invention is to provide a split cone bearing having the advantages of prematched, positively oriented cone halves which maintain their identity and relative positions without selection.

A further object of the invention is to provide a ball bearing of the split cone type which is prefabricated in two parts, designed to provide three parts during assembly.

With the above and other objects in view which will appear as the description proceeds, the invention consists in the novel features herein set forth, illustrated in the accompanying drawings, and more particularly pointed out in the appended claims.

Figure 2:
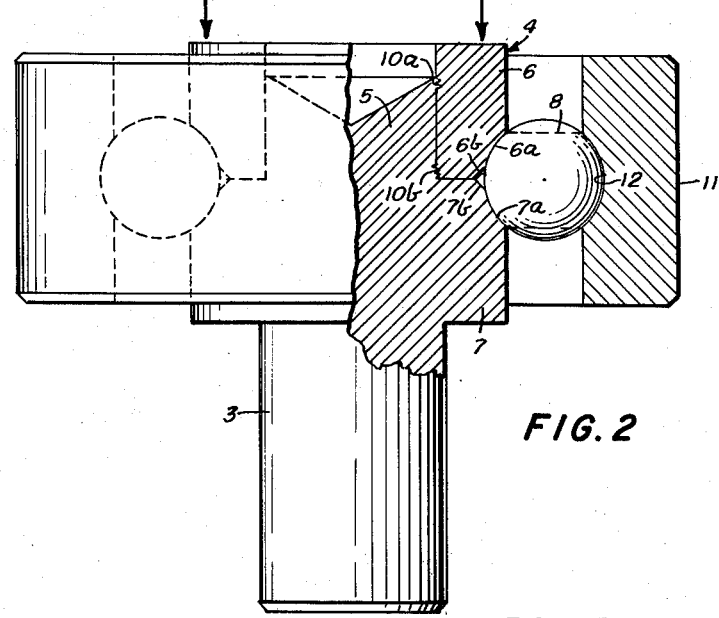

Referring to the drawings in which numerals of like character designate similar parts throughout both views:

FIG. 1 is a side elevational view, partly in section, illustrating the parts of the bearing of the present invention in their prefabricated condition; and FIG. 2 is a similar view showing the parts assembled.

In the drawings, referring first to FIG. 1, the spindle 3, which is formed of conventional bearing material, is initially machined with an enlarged, integral head, generally indicated by the numeral 4. Intermediate its longitudinal extremities, the head 4 is radially reduced in diameter to provide a concentric cylindrical stud 5 which terminates integrally at opposite ends with inner race halves 6 and 7. The adjacent inner edges of these halves are arcuately grooved as at 6a and 7a respectively, with a transverse cross-sectional radius complementary to the radius of the balls 8 of the bearing assembly. Thus, when the two halves 6 and 7 are forced together in assembled form, as will later appear, the grooves 6a and 7a jointly form a split cone or inner raceway on the spindle to accommodate the balls 8.

The outer end of the head 4 is concentrically drilled as at 9 to provide a cylindrical recess of a diameter slightly less than that of the outer periphery of the stud 5. This recess is extended longitudinally into the head 4 to such a depth that the lower extremity of its peripheral wall terminates in slightly upwardly spaced relation to the upper extremity of the stud 5, thus providing a relatively thin, annular breakaway area 10 at the bottom of recess 9, which temporarily maintains the upper race half 6 and the upper end of the stud 5 in connected condition, as seen in FIG. 1.

The outer raceway 11 is of conventional form and comprises an annular ring having an internal arcuate groove 12 of a transverse cross-sectional radius complementary to that of the balls 8, as in the case of the inner raceway jointly formed by the grooves 6a and 7a of the inner race members 6 and 7.

Preferably, the adjacent edges of the grooved areas 6a and 7a are bevelled at 6b and 7b respectively, to facilitate the insertion of the balls 8 during assembly of the bearing, as hereinafter explained.

It will thus be seen that in prefabricated form, the bearing comprises only two parts, exclusive of the balls 8, namely, the spindle 3 and the two integrally formed halves of the inner race, and the separate outer race member 11. The two halves 6 and 7 of the inner race are thereby prematched and positioned to receive the balls when the bearing is assembled, which materially reduces the time and number of parts requiring handling during assembly.

In assembling the bearing, the spindle 3 with its integral head 4 is inserted within the outer raceway member 11 with the stud portion 5 extending partially from one end of the central opening in the outer raceway member as shown in FIG. 1. The set of balls 8 are then dropped into the upper end of the outer raceway 11 so that their peripheries engage the bevelled portions 6b and 7b of the respective inner race halves 6 and 7. It will be seen that the annular recess which separates the raceway halves 6 and 7 and defines the stud 5 is of a depth and longitudinal dimension to partially receive the balls 8, while, at the same time, preventing the balls from dropping completely through the outer race member 11 by their engagement around the bevel 7b of race half 7. With the balls and inner race members in this position, the spindle 3 and head 4 are longitudinally retracted along with the balls 8 into the outer race member 11 until the balls reach the inner groove 12 in the latter. The balls then roll outwardly until their peripheries contact the inner periphery of the groove 12, in which position they remain until the final step in the assembly operation.

This final step consists simply in applying a blow or sufficient longitudinal force on the outer end of the raceway half 6 to sever the annular breakaway area 10, whereupon the central recess 9 in raceway half 6 tightly embraces the outer periphery of the stud 5 with a pressed fit as shown in FIG. 2. In severing the breakaway area 10, annular roughened areas 10a and 10b are left at the upper extremity of the stud 5 and the lower extremity of the recess 9 respectively, which together with the slight difference in diameters of the recess 9 and stud 5, facilitates a firm engagement of the raceway half 6 with the stud. Thus, no additional securing means, such as rivets or the like, are required to retain the joint inner raceway 6, 7 in assembled form.

It will be apparent that with this construction, the inner race sections are held in annular and radial alignment throughout fabrication and assembly, which provides for maximum concentricity in the final assembly. Furthermore, assembly is greatly simplified for the reason that only two parts, in addition to the balls, require handling.

While the bearing of the present invention is adaptable to various uses, it is of special utility in the manufacture of low cost bearings where the parts thereof do not require careful grinding to close tolerances. It is felt that the economy of this bearing will be clearly apparent.

From the foregoing, it is believed that the invention may be readily understood by those skilled in the art without further description, it being borne in mind that numerous changes may be made in the details disclosed without departing from the spirit of the invention as set forth in the following claims.

I claim:

1. For use in forming a bearing assembly comprising an annular outer race member having a grooved raceway therein, a set of balls, and a complementary inner raceway; a prefabricated inner race structure consisting of integral, first and second concentric raceway halves respectively provided at adjacent ends with annular peripheral grooves of radii complementary to those of said balls and said outer raceway when the inner race structure is mounted within the annular outer race member, said first raceway half having a concentric axial bore at one end, said raceway halves being axially spaced by an integral, concentric, radially reduced stud of a diameter slightly greater than that of said bore, said stud being connected at one end to said second raceway half with its opposite end projecting slightly within the confines of the lower end of the bore in said first raceway half, the periphery of the projecting end of said stud being connected to the wall of the bore in said first raceway half by a relatively thin, annular breakaway section, said breakaway section being adapted to break easily between the adjacent peripheries of said stud and bore as said first raceway half is forced inwardly onto said stud into abutment with said second raceway half to jointly form therewith the inner raceway of said assembly.

2. A prefabricated article of manufacture comprising a spindle radially enlarged at one end, forming concentric, integral, first and second inner raceway halves for ball bearings, said raceway halves being precisely matched and oriented as to their radial relation and axially spaced by a concentric stud of reduced diameter providing an annular recess between and contiguous with said raceway halves, said first raceway half having an axial bore of a diameter slightly less than that of said stud, the boundary of said bore being connected to the outer end of said stud by a thin, annular breakaway web lying within the longitudinal and radial confines of said bore, said stud and raceway halves adapted to be assembled within a complementary outer raceway with a series of ball bearings therebetween by breaking said web and forcing the bore of said first raceway half onto said stud in end to end abutment with said second raceway half.

3. A set of prefabricated coacting bearing components for a ball bearing assembly including an inner raceway structure as claimed in claim 2, and an outer race member, the latter comprising an annular, open-ended, outer race structure within which said inner race structure is longitudinally insertable in radially spaced relation, an outer raceway in said outer race structure complementary to said inner raceway, and a set of balls insertable between said raceways through an open end of said outer race structure, the respective contiguous boundaries of said annular recess and inner raceway halves being radially spaced from the inner periphery of said outer race structure, a distance less than the diameter of said balls, and said annular recess which separates said inner raceway halves being dimensioned to partially receive said balls when said inner race structure is projected longitudinally from said outer race structure to partially expose said annular recess in longitudinally offset relation to said outer raceway, whereby said balls are retained in annular alignment in said annular recess and within the inner periphery of said outer race structure until the inner race structure is shifted longitudinally to bring said annular recess adjacent said outer raceway.

4. A prefabricated inner race member for assembly with a grooved outer race member with a series of ball bearings therebtween; said inner race member comprising a one-piece structure consisting of integral, first and second concentric raceway halves respectively provided with matched annular ball race grooves complementary to the grooved outer race member, said inner raceway halves being integrally maintained in axially spaced relation by an intervening, concentric stud of reduced diameter, said first raceway half having an axial bore at its outer end of a diameter slightly less than that of said stud to provide a pressed fit with the latter, the bounding wall of said bore terminating at its inner longitudinal extremity in a relatively thin, annular breakaway section lying within the confines of said bore and peripherally joining the wall of the bore around the end of said stud, said breakaway section being adapted to break easily around the periphery of said stud as said first raceway half is forced inwardly onto said stud into abutment with said second raceway half.

5. A structure as claimed in claim 4, wherein the respective boundaries of the severed breakaway section form roughened, annular gripping portions for maintaining fixed engagement between adjacent peripheries of said first raceway half and said stud.

References Cited by the Examiner

UNITED STATES PATENTS

| 1,617,085 | 2/27 | Specht | 29—148 |
| 1,782,622 | 11/30 | Kilian | 308—196 X |
| 1,973,064 | 9/34 | Gwinn | 308—196 X |
| 2,624,898 | 10/52 | Adams | 308—196 |
| 2,724,867 | 11/55 | Smith | 29—411 X |
| 2,847,754 | 8/58 | Woodward | 29—411 |

DON A. WAITE, *Primary Examiner.*